United States Patent
Shimizu

(10) Patent No.: US 12,187,650 B2
(45) Date of Patent: Jan. 7, 2025

(54) SILICON CARBIDE CERAMIC HONEYCOMB STRUCTURE AND ITS PRODUCTION METHOD

(71) Applicant: PROTERIAL, LTD., Tokyo (JP)

(72) Inventor: Kenichiro Shimizu, Fukuoka (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/640,593

(22) Filed: Apr. 19, 2024

(65) Prior Publication Data

US 2024/0262755 A1 Aug. 8, 2024

Related U.S. Application Data

(63) Continuation of application No. 18/037,677, filed as application No. PCT/JP2022/013577 on Mar. 23, 2022.

(30) Foreign Application Priority Data

Mar. 26, 2021 (JP) ................. 2021-054390

(51) Int. Cl.
*C04B 35/565* (2006.01)
*C04B 35/63* (2006.01)
*C04B 38/00* (2006.01)

(52) U.S. Cl.
CPC ........ *C04B 35/565* (2013.01); *C04B 35/6303* (2013.01); *C04B 38/0009* (2013.01);
(Continued)

(58) Field of Classification Search
None
See application file for complete search history.

(56) References Cited

U.S. PATENT DOCUMENTS

2006/0154068 A1 7/2006 Otsuka et al.
2007/0033912 A1 2/2007 Furukawa et al.
(Continued)

FOREIGN PATENT DOCUMENTS

JP 2007-290951 A 11/2007
JP 2009-196104 A 9/2009
(Continued)

OTHER PUBLICATIONS

International Search Report for PCT/JP2022/013577 dated May 17, 2022.
(Continued)

*Primary Examiner* — Elizabeth Collister
(74) *Attorney, Agent, or Firm* — Sughrue Mion, PLLC

(57) ABSTRACT

A silicon carbide ceramic honeycomb structure having large numbers of axially penetrating flow paths partitioned by porous silicon carbide cell walls and being formed by integrally bonding honeycomb segments by binder layers, the cell walls having porosity of 40-50% and a median pore diameter of 8-18 μm, an average pore width W determined by averaging the lengths (pore widths) of all measured pore portions being 10-25 μm, the number N of pores per length determined by dividing the total number of the measured pores by the total length of the straight lines used for measurement being 20-40/mm, and the volume of pores having pore diameters of 20 μm or more being 10-20% of the total pore volume in the cell walls and the volume of pores having pore diameters of 9 μm or less being 3-25% of the total pore volume in the cell walls, measured by mercury porosimetry.

4 Claims, 4 Drawing Sheets

(52) U.S. Cl.
CPC ...... *C04B 38/0054* (2013.01); *C04B 38/0074* (2013.01); *C04B 2235/3826* (2013.01); *C04B 2235/6021* (2013.01); *C04B 2235/606* (2013.01)

(56) References Cited

U.S. PATENT DOCUMENTS

| | | |
|---|---|---|
| 2007/0293392 A1 | 12/2007 | Ohno et al. |
| 2014/0370233 A1 | 12/2014 | Izumi et al. |
| 2018/0050333 A1 | 2/2018 | Okazaki |
| 2018/0214810 A1 | 8/2018 | Iida et al. |
| 2018/0264453 A1 | 9/2018 | Kuki |
| 2019/0262820 A1 | 8/2019 | Yamamoto |
| 2022/0193593 A1* | 6/2022 | Ogata .................. C04B 35/195 |
| 2024/0034685 A1 | 2/2024 | Shimizu |

FOREIGN PATENT DOCUMENTS

| | | |
|---|---|---|
| JP | 2018-122261 A | 8/2018 |
| JP | 2018-149510 A | 9/2018 |
| JP | 2019-150737 A | 9/2019 |
| WO | WO2004/106265 A1 | 12/2004 |
| WO | 2005/009922 A1 | 2/2005 |
| WO | 2016/152236 A1 | 9/2016 |

OTHER PUBLICATIONS

Office Action for Japanese Application No. 2022-539770 mailed Aug. 23, 2022 (drafted Aug. 10, 2022).
Machine translation of Koji et al. (JP 2009196104 A) from EPO, translated Dec. 29, 2023. (Year: 2009).

\* cited by examiner

SILICON CARBIDE CERAMIC HONEYCOMB STRUCTURE AND ITS PRODUCTION METHOD

CROSS REFERENCE TO RELATED APPLICATIONS

This application is a Continuation of application Ser. No. 18/037,677 filed Sep. 15, 2023, which is a National Stage of International Application No. PCT/JP2022/013577 filed Mar. 23, 2022, claiming priority based on Japanese Patent Application No. 2021-054390 filed Mar. 26, 2021. Application Ser. No. 18/037,677 is hereby expressly incorporated by reference, in its entirety, into the present application.

FIELD OF THE INVENTION

The present invention relates to a silicon carbide ceramic honeycomb structure used for a ceramic honeycomb filter, and a method for producing the silicon carbide ceramic honeycomb structure.

BACKGROUND OF THE INVENTION

Because NOx and PM contained in exhaust gases of diesel engines are likely to adversely affect humans and environment when discharged into the air, a honeycomb structure carrying a NOx catalyst, and a ceramic honeycomb filter for capturing PM have conventionally been attached as discharge equipment to the discharge pipe of the diesel engine. An example of ceramic honeycomb filters for cleaning an exhaust gas by capturing PM therein is shown in FIGS. 1(a) and 1(b). A ceramic honeycomb filter 100 is constituted by a ceramic honeycomb structure 110 comprising porous cell walls 12 forming large numbers of outlet-side-sealed flow paths 13 and inlet-side-sealed flow paths 14 and an outer peripheral wall 11, and upstream-side plugs 16a and downstream-side plugs 16b sealing the exhaust-gas-introducing-side end surface 15a and the exhaust-gas-discharging end surface 15b of the flow paths 13, 14 alternately in a checkerboard pattern. As shown by dotted arrows in FIG. 1(b), the exhaust gas flows into the outlet-side-sealed flow paths 13 open on the exhaust-gas-introducing-side end surface 15a, passes through communicating pores on and in the cell walls 12, and is discharged from the inlet-side-sealed flow paths 14. While the exhaust gas passes through the communicating pores in the cell walls 12, PM in the exhaust gas is captured, so that the exhaust gas is cleaned. When the captured PM is accumulated to a predetermined amount, it is burned to regenerate the ceramic honeycomb filter. It is important that such ceramic honeycomb structure has improved performance of particularly capturing nanosized particles among PM. Also, to remove toxic gas components from the exhaust gas, a catalyst is carried on the porous cell walls. It is known that to form such ceramic honeycomb structure, refractory particles such as silicon carbide (SiC) particles having excellent heat shock resistance are used.

As a honeycomb structure capable of capturing even nanosized fine particles, for example, JP 2009-196104 A (Patent Reference 1) discloses a porous ceramic honeycomb structure comprising ceramic powder and a binder binding the ceramic powder particles, the ceramic powder having a 10-% particle diameter (D10) and a 90-% particle diameter (D90), whose gap is 10 μm or more, a 20-% particle diameter (D20) and an 80-% particle diameter (D80) meeting log D20/log D80<0.85, and a particle diameter distribution having two or more peaks. JP 2009-196104 A describes that at least one of silicon carbide and silicon nitride is used as the ceramic powder, and that the binder is colloidal silica, etc.

As a plugged honeycomb structure having excellent capturing performance with suppressed pressure loss unevenness, JP 2018-149510 A (Patent Reference 2) discloses a plugged honeycomb structure comprising a columnar honeycomb structure body having porous cell walls constituting large numbers of cells forming fluid flow paths extending from the inlet end surface to the outlet end surface, and plugs each formed in the opening portion of each cell on the inlet or outlet end surface, in a cumulative pore volume of the cell walls measured by mercury porosimetry,
a pore diameter D10 being 6 μm or more,
a pore diameter D90 being 58 μm or less, and
the relation (1) of 0.35≤(D70−D30)/D50≤1.5 being met, wherein D10 is a pore diameter at a cumulative pore volume of 10%, D30 is a pore diameter at a cumulative pore volume of 30%, D50 is a pore diameter at a cumulative pore volume of 50%, D70 is a pore diameter at a cumulative pore volume of 70%, and D90 is a pore diameter at a cumulative pore volume of 90%.

JP 2018-149510 A describes as an example a honeycomb structure produced by using silicon carbide powder and metallic silicon powder.

As a honeycomb structure capable of suppressing pressure loss increase even after carrying a catalyst on cell walls, JP 2019-150737 A (Patent Reference 3) discloses a honeycomb structure comprising a columnar honeycomb structure body comprising porous cell walls constituting large numbers of cells forming fluid flow paths extending from the first end surface to the second end surface, the cell walls having a porosity of 45-65% and an average pore diameter of 15-25 μm, and
the volume ratio of pores having diameters of 10 μm or less being 10% or less of the total pore volume of the cell walls, and the volume ratio of pores having diameters of 40 μm or more being 10% or less, in the cumulative pore volume of the cell walls measured by mercury porosimetry.

JP 2019-150737 A describes that the cell walls of the honeycomb structure are made of at least one material selected from the group consisting of silicon carbide, cordierite, composite materials of silicon and silicon carbide, composite materials of cordierite and silicon carbide, silicon nitride, mullite, alumina, and aluminum titanate.

As a honeycomb structure having improved capturing performance, JP 2018-122261 A (Patent Reference 4) discloses a plugged honeycomb structure comprising a columnar honeycomb structure body comprising porous cell walls constituting large numbers of cells forming fluid flow paths extending from the first end surface to the second end surface, and plugs each formed in the opening portion of each cell on the first or second end surface, the cell walls being made of a material comprising silicon carbide,
the porosity of the cell walls measured by mercury porosimetry being 42-52%,
the cell walls having thickness of 0.15-0.36 mm,
the volume ratio of pores having diameters of 10 μm or less being 41% or less of the total pore volume of the cell walls, and the volume ratio of pores having diameters of 18-36 μm being 10% or less of the total pore volume, in the cumulative pore volume of the cell walls measured by mercury porosimetry, and a pore diameter at the maximum log (differential pore volume) being in a range of 10-16 μm, and a peak containing the maximum log (differential pore volume) having a half width of 5 μm or less, in the pore diameter distribution of the cell walls, in which the axis of abscissas represents a pore diameter, and the axis of ordinate represents a log (differential pore volume).

JP 2018-122261 A describes as an example a honeycomb structure produced by using silicon carbide powder and metallic silicon powder.

By the ceramic honeycomb structures described in Patent References 1-4, however, nanosized PM dominantly affecting the number of particles in an exhaust gas may not be effectively captured, and the pressure loss after capturing PM may not be satisfactory. Accordingly, further improvement is desired.

Object of the Invention

Accordingly, an object of the present invention is to provide a silicon carbide ceramic honeycomb structure having a PM-capturing ratio capable of effectively capturing nanosized PM dominantly affecting the number of PM particles, and showing satisfactory pressure loss after capturing PM, while maintaining high heat shock resistance, and its production method.

SUMMARY OF THE INVENTION

Paying attention to the shape of pores in cell wall cross sections of ceramic honeycomb structures in view of the above object, the inventor has made intense research, finding that the above object can be achieved by a particular pore structure of the cell walls of a honeycomb structure. The present invention has been completed based on such finding.

Thus, the silicon carbide ceramic honeycomb structure of the present invention has large numbers of axially penetrating flow paths partitioned by porous silicon carbide cell walls,
the cell walls having a porosity of 35-50% and a median pore diameter of 8-18 μm, and
when a straight line C is drawn in parallel with the cell wall surface such that it passes a center in the direction of the thickness T of the cell wall, and straight lines are drawn in parallel with the straight line C such that they are separate from the straight line C by ±T/5 and ±2T/5 in the thickness direction of the cell wall, to measure the lengths (pore widths) of pore portions crossing each straight line, and the number of pores crossing each straight line, in a cell wall cross section perpendicular to the axial direction,
an average pore width W determined by averaging the lengths (pore widths) of all measured pore portions being 10-25 μm, and
the number N of pores per length determined by dividing the total number of the measured pores by the total length of the straight lines used for measurement being 20-40/mm.

In the silicon carbide ceramic honeycomb structure of the present invention, the volume of pores having diameters of 20 μm or more in the cell walls is preferably 10-20% of the total pore volume, in the relation between the pore diameter and cumulative pore volume of the cell walls measured by mercury porosimetry.

In the silicon carbide ceramic honeycomb structure of the present invention, the volume of pores having diameters of 9 μm or less in the cell walls is preferably 3-25% of the total pore volume, in the relation between the pore diameter and cumulative pore volume of the cell walls measured by mercury porosimetry.

The method of the present invention for producing a silicon carbide ceramic honeycomb structure comprises formulating, mixing and blending ceramic particles comprising aggregate and a binder, and an organic binder to form a moldable material, extrusion-molding the moldable material to obtain a green body having a honeycomb shape, and drying and sintering the green body,
the aggregate being silicon carbide particles, and
the ceramic particles having a median particle diameter D50 of 35-45 μm, a particle diameter D10 (at a cumulative particle volume corresponding to 10% of the total particle volume) of 5-20 μm, a particle diameter D90 (at a cumulative particle volume corresponding to 90% of the total particle volume) of 50-65 μm, and a particle size distribution deviation SD of 0.20-0.40, wherein SD=log(D80)−log(D20), D20 is a particle diameter at a cumulative particle volume corresponding to 20% of the total particle volume, D80 is a particle diameter at a cumulative particle volume corresponding to 80% of the total particle volume, and D20<D80, in a curve showing the relation between particle diameter and cumulative particle volume.

In the method of the present invention for producing a silicon carbide ceramic honeycomb structure, the binder is preferably at least one selected from the group consisting of alumina particles, aluminum hydroxide particles, magnesium oxide particles and magnesium hydroxide particles.

Effects of the Invention

The present invention can provide a ceramic honeycomb structure capable of effectively capturing nanosized PM dominantly affecting the number of particles in an exhaust gas while keeping high heat shock resistance, with satisfactory pressure loss after capturing PM.

DESCRIPTION OF THE PREFERRED EMBODIMENTS

The embodiments of the present invention will be explained below referring to the attached drawings. It should be noted that the present invention is not restricted to the embodiments below, and that modifications and improvements may be made within the scope of the present invention.

[1] Silicon Carbide Ceramic Honeycomb Structure

The silicon carbide ceramic honeycomb structure of the present invention comprises large numbers of axially penetrating flow paths partitioned by porous silicon carbide cell walls, the cell walls having a porosity of 35-50% and a median pore diameter of 8-18 μm, when a straight line C is drawn in parallel with the cell wall surface such that it passes a center in the direction of the thickness T of the cell wall, and straight lines are drawn in parallel with the straight line C such that they are separate from the straight line C by ±T/5 and ±2T/5 in the thickness direction of the cell wall, to measure the lengths (pore widths) of pore portions crossing each straight line, and the number of pores crossing each straight line, in a cell wall cross section perpendicular to the axial direction, an average pore width W determined by averaging the lengths (pore widths) of all measured pore portions being 10-25 μm, and the number N of pores per length determined by dividing the total number of the measured pores by the total length of the straight lines used for measurement being 20-40/mm.

With such a structure, the ceramic honeycomb structure can effectively capture nanosized PM with good pressure loss after capturing PM, while maintaining high heat shock resistance.

The average pore width W determined by averaging the pore widths measured in the cell wall cross section is 10-25 μm. When the average pore width W is less than 10 μm, it is difficult to maintain low pressure loss after capturing PM. On the other hand, when it is more than 25 μm, the ratio of capturing nanosized PM is low. The lower limit of the average pore width W is preferably 12 μm, and the upper limit is preferably 23 μm, and more preferably 19 μm.

The number N of pores per length measured in the cell wall cross section is 20-40/mm. When the number N of pores per length is less than 20/mm, it is difficult to maintain low pressure loss after capturing PM. On the other hand, when it is more than 40/mm, the ratio of capturing nanosized PM is low. The lower limit of the number N of pores per length is preferably 22/mm, and the upper limit is preferably 37/mm.

Figure 4:
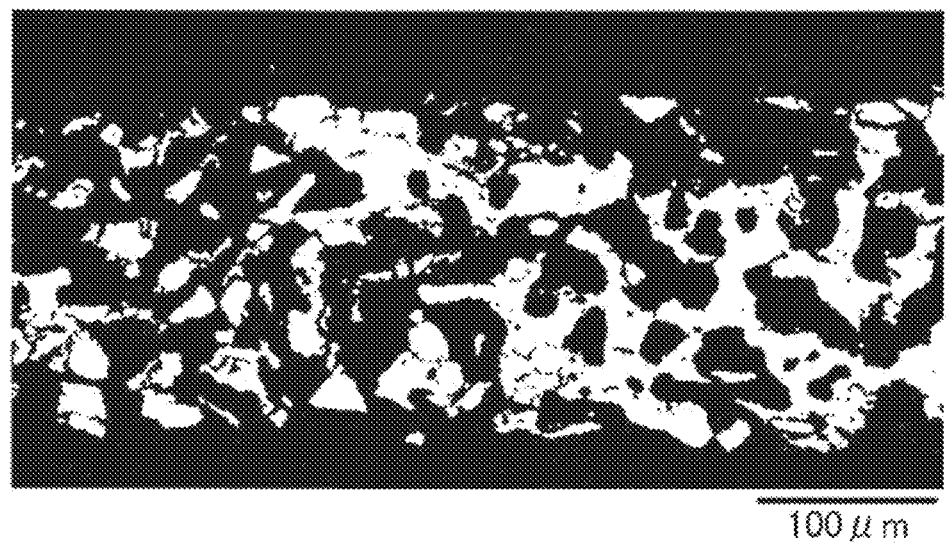
FIG. 4 is a binary-processed SEM photograph of a cross section of a cell wall in the silicon carbide ceramic honeycomb structure of Example 2.
Figure 5:
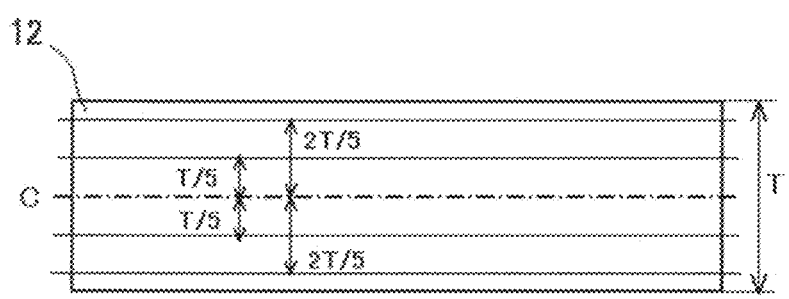
FIG. 5 is a schematic view for explaining positions at which average pore width and the number of pores per length are measured, in a cross section of a cell wall.

The average pore width W and the number N of pores per length are determined by photographing a cell wall cross section perpendicular to the axial direction of the ceramic honeycomb structure by a scanning electron microscope (SEM), and processing the resultant SEM photograph by an image analyzer (Image-Pro Plus ver. 7.0 available from Media Cybernetics) as follows. First, the SEM photograph is processed to a binary image. FIG. 4 shows an example of binary images. As shown in FIG. 5, in the photographed cross section of the cell wall 12, a straight line C is drawn in parallel with the cell wall surface such that it passes a center in the direction of the thickness T of the cell wall, and straight lines are drawn in parallel with the straight line C such that they are separate from the straight line C by ±T/5 and ±2T/5 in the thickness direction of the cell wall. The pore widths (the lengths of pore portions crossing each straight line) and the number of pores crossing each straight line are measured with respect to the predetermined length of each straight line. A sum of the measured widths of all pores is divided by the total number of measured pores to determine the average pore width W, and the total number of measured pores is divided by the total length of the straight lines used for measurement to determine the number N of pores per length.

The porosity is 35-50%. When the porosity is less than 35%, it is difficult to maintain low pressure loss after capturing PM. On the other hand, when it is more than 50%, the ratio of capturing nanosized PM is low. The lower limit of the porosity is preferably 38%, and more preferably 40%. On the other hand, the upper limit of the porosity is preferably 49%, more preferably 48%, and most preferably 46%. The porosity of cell walls is measured by mercury porosimetry described below.

The median pore diameter is 8-18 μm. When the median pore diameter is less than 8 μm, it is difficult to maintain low pressure loss after capturing PM. On the other hand, when it is more than 18 μm, the ratio of capturing nanosized PM is low. The median pore diameter is preferably 10-15 μm. The median pore diameter is a pore diameter at which a cumulative pore volume is 50% of the total pore volume, in a pore size distribution curve of cell walls measured by mercury porosimetry described below.

The pore volume in a pore diameter range of 20 μm or more is preferably 10-20% of the total pore volume. When the pore volume at 20 μm or more is less than 10% of the total pore volume, it may be difficult to maintain low pressure loss after capturing PM. On the other hand, when it is more than 20%, the ratio of capturing nanosized PM may be low. It is preferably 12-18%.

The pore volume in a pore diameter range of 9 μm or less is preferably 3-25% of the total pore volume. When the pore volume at a pore diameter of 9 μm or less is less than 3% of the total pore volume, it may be difficult to maintain low pressure loss after capturing PM. On the other hand, when it is more than 25%, the ratio of capturing nanosized PM may be low. Its lower limit is preferably 4%, and its upper limit is preferably 23%.

The measurement of the cumulative pore volume by mercury porosimetry uses, for example, Autopore III 9410 available from Micromeritics. In the measurement of the cumulative pore volume by mercury porosimetry, a test piece (10 mm×10 mm×10 mm) cut out of each ceramic honeycomb structure is set in a measurement cell, the cell is evacuated, and mercury is then introduced into the cell under pressure to measure the volume of mercury intruded into pores in the test piece. Because mercury is introduced into finer pores under higher pressure, the relation between a pore diameter and a cumulative pore volume (cumulative volume of pores in a range from the maximum pore diameter to a particular pore diameter) can be determined from the pressure and the volume of mercury intruded into pores. Because mercury is introduced into pores successively from larger pore diameters to smaller pore diameters, the pressure is converted to pore diameter, and a cumulative pore volume determined by cumulating pore volumes from larger pore diameters to smaller pore diameters, which corresponds to the volume of mercury, is plotted against the pore diameter. The starting pressure of intruding mercury is herein 0.5 psi ($0.35 \times 10^{-3}$ kg/mm$^2$, corresponding to a pore diameter of about 362 μm), and the cumulative pore volume when mercury pressure reaches 1800 psi (1.26 kg/mm$^2$, corresponding to a pore diameter of about 0.1 μm) is defined as the total pore volume.

Figure 1A:
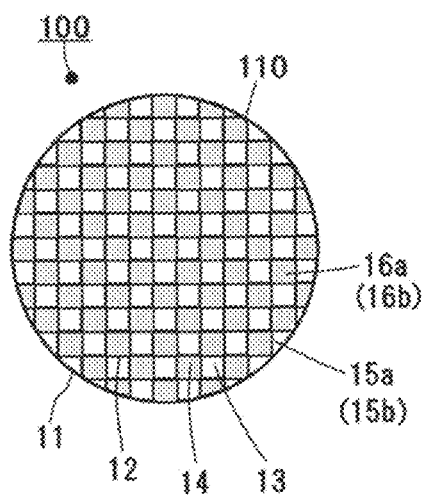
FIG. 1(a) is a front view schematically showing an example of ceramic honeycomb filters.
Figure 1B:
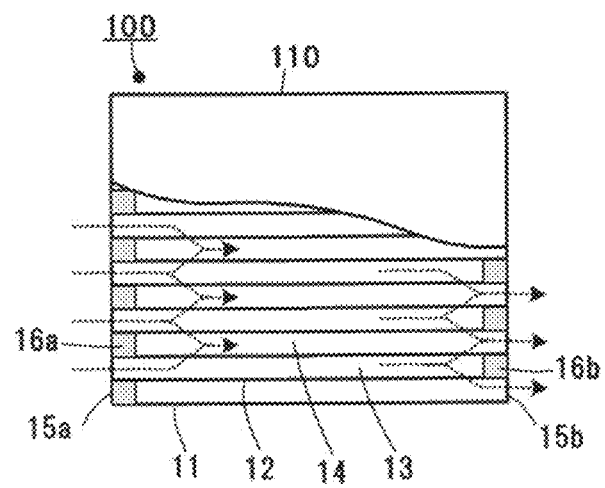
FIG. 1(b) is a partial cross-sectional view schematically showing an example of ceramic honeycomb filters in parallel with the axial direction.
Figure 2:
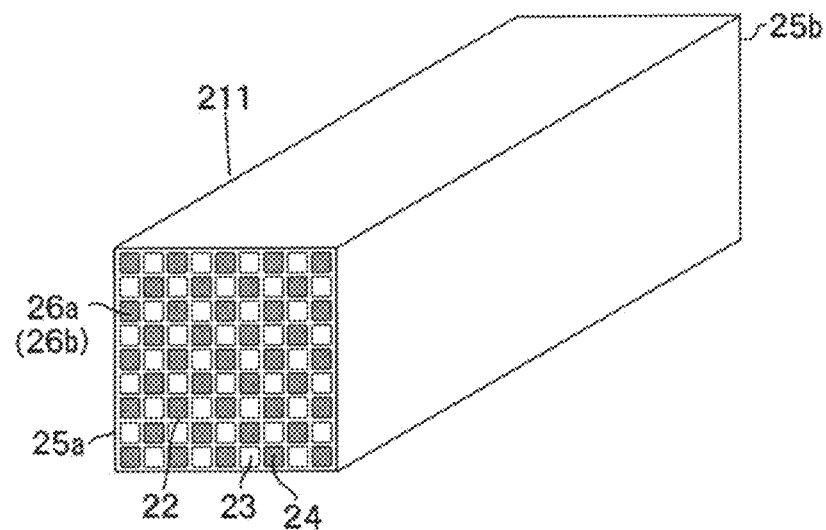
FIG. 2 is a perspective view schematically showing a ceramic honeycomb segment.
Figure 3:
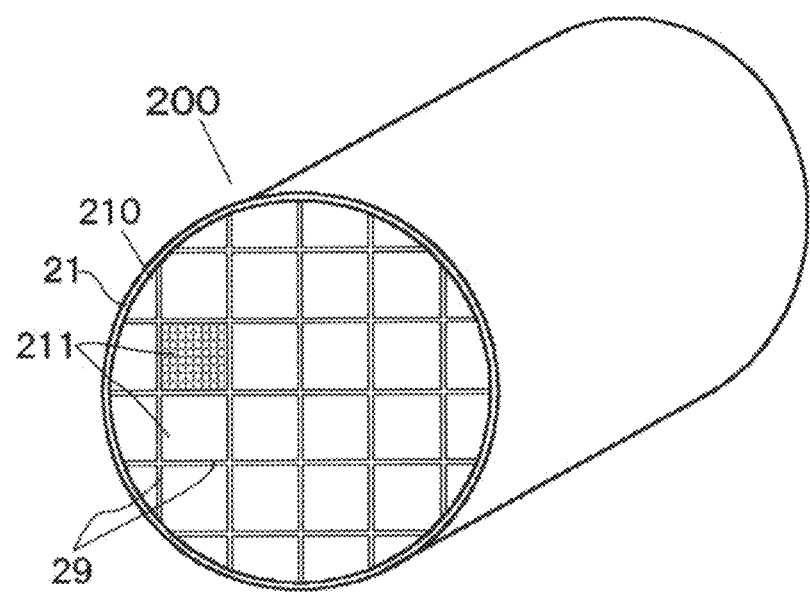
FIG. 3 is a perspective view schematically showing an example of ceramic honeycomb filters formed by integral bonding.

The silicon carbide ceramic honeycomb structure of the present invention may be used as a honeycomb segment 211 as shown in FIG. 2, and large numbers of honeycomb segments 211 may be integrally bonded with binder layers 29 to form a composite silicon carbide ceramic honeycomb structure 210 as shown in FIG. 3. After integrally bonding large numbers of honeycomb segments 211 by binder layers 29, the resultant composite structure is machined to have an outer periphery having a circular, oval, triangular, rectangular or any other desired shape in a cross section perpendicular to its flow paths, and the machined outer periphery is covered with a coating material to form an outer peripheral wall 21.

The flow paths of the silicon carbide ceramic honeycomb structure 110, 210 of the present invention on the exhaust-gas-introducing side 25a or the exhaust-gas-discharging side 25b may be alternately plugged in a checkerboard pattern by a known method, to provide a ceramic honeycomb filter 100, 200. In the case of a ceramic honeycomb filter 200 formed by integral bonding, plugs 26a, 26b may be formed in the honeycomb segments 211 before or after integrally bonded. These plugs may be formed on the end surface on the exhaust-gas-introducing or exhaust-gas-discharging side of the flow paths, or in inner portions of the flow paths inside the inlet-side or outlet-side end surface 25a, 26b.

[2] Production Method of Silicon Carbide Ceramic Honeycomb Structure

An example of the methods of the present invention for producing a silicon carbide ceramic honeycomb structure will be explained.

Ceramic particles comprising aggregate and binders are mixed and blended with an organic binder to form a moldable material, which is extruded in a honeycomb shape to obtain a green body. The green body is dried and then sintered. The above aggregate is composed of silicon carbide particles, and the above ceramic particles have a median particle diameter $D50$ of 35-45 μm. In a curve showing the relation between particle diameter and cumulative particle volume, the particle diameter $D10$ at a cumulative particle volume corresponding to 10% of the total particle volume is 5-20 μm, the particle diameter $D90$ at a cumulative particle volume corresponding to 90% of the total particle volume is 50-65 μm, and the particle size distribution deviation $SD$ is 0.20-0.40, wherein $SD=\log(D80)-\log(D20)$, $D20$ is a particle diameter at a cumulative particle volume corresponding to 20% of the total particle volume, $D80$ is a particle diameter at a cumulative particle volume corresponding to 80% of the total particle volume, and $D20<D80$.

Such method can produce a silicon carbide ceramic honeycomb structure having cell walls with porosity of 35-50% and a median pore diameter of 8-18 μm, as well as an average pore width $W$ of 10-25 μm and the number $N$ of pores per length of 20-40/mm in a cell wall cross section perpendicular to the axial direction.

Figure 6:
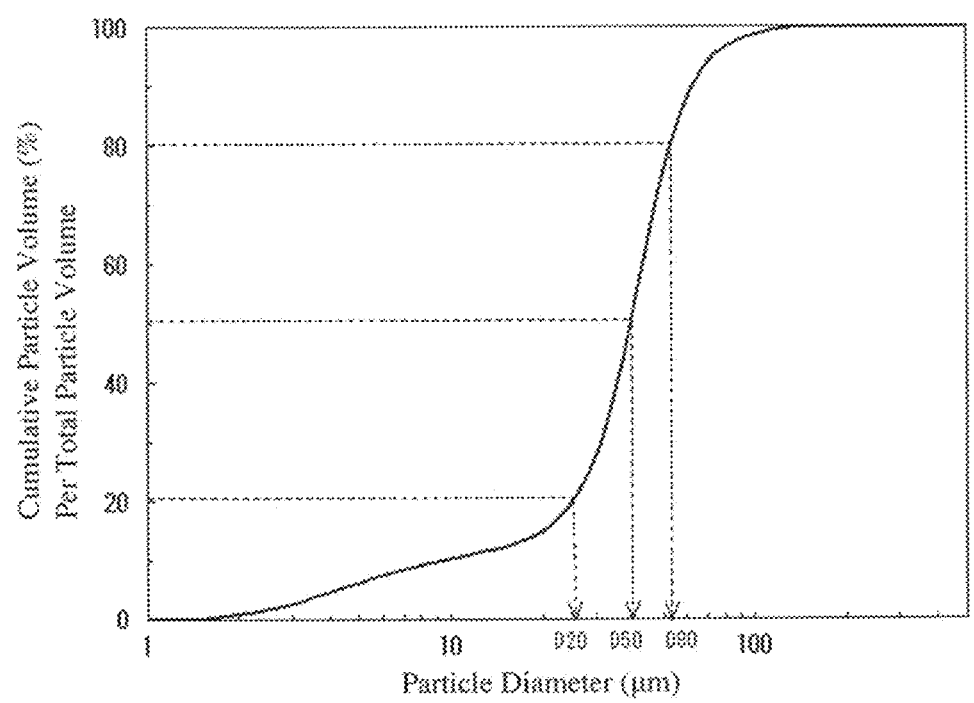
FIG. 6 is a graph showing a particle size distribution of ceramic particles used in Examples of the present invention.

The particle diameters of the ceramic particles can be measured by, for example, a particle diameter distribution meter (Microtrack MT3000 available from Nikkiso Co., Ltd.). FIG. 6 shows an example of the relations between the measured particle diameter and the cumulative particle volume determined by cumulating the volume of particles having particle diameters up to the particular one. In the curve shown in FIG. 6, $D10$ (μm) is a particle diameter at a cumulative particle volume corresponding to 10% of the total particle volume, a median particle diameter ($D50$) (μm) is a particle diameter at a cumulative particle volume corresponding to 50% of the total particle volume, and $D90$ (μm) is a particle diameter at a cumulative particle volume corresponding to 90% of the total particle volume. The particle size distribution deviation $SD$ is expressed by $SD=\log(D80)-\log(D20)$, wherein $D20$ is a particle diameter (μm) at a cumulative particle volume corresponding to 20% of the total particle volume, and $D80$ is similarly a particle diameter (μm) at a cumulative particle volume corresponding to 80% of the total particle volume. Incidentally, $D20<D80$.

The ceramic particles have a median particle diameter $D50$ of 35-45 μm. When the median particle diameter $D50$ is less than 35 μm, pores formed in the cell walls have small diameters, making it difficult to maintain low pressure loss when PM is captured. On the other hand, when it is more than 45 μm, pores formed in the cell walls have too large diameters, lowering the ratio of capturing nanosized PM. The lower limit of the median particle diameter $D50$ is preferably 37 μm, and the upper limit is preferably 43 μm.

The ceramic particles have $D10$ of 5-20 μm. When the $D10$ is less than 5 μm, the percentage of fine pores deteriorating pressure loss characteristics is undesirably high among pores formed in the cell walls. On the other hand, when it is more than 20 μm, nanosized PM may not be effectively captured. The lower limit of $D10$ is preferably 7 μm, and the upper limit is preferably 18 μm.

The ceramic particles have $D90$ of 50-65 μm. When the $D90$ is less than 50 μm, it is difficult to maintain low pressure loss when PM is captured. On the other hand, when it is more than 65, the ratio of capturing nanosized PM is low. The lower limit of $D90$ is preferably 52 μm, and the upper limit is 63 μm.

The ceramic particles have a particle size distribution deviation $SD$ of 0.20-0.40, wherein $SD=\log(D80)-\log(D20)$, $D20$ is a particle diameter at a cumulative particle volume corresponding to 20% of the total particle volume, $D80$ is a particle diameter at a cumulative particle volume corresponding to 80% of the total particle volume, and $D20<D80$. When the $SD$ is less than 0.20, the percentage of fine pores is high among pores formed in the cell walls, making it difficult to maintain low pressure loss when PM is captured. On the other hand, when it is more than 0.40, the percentage of large pores lowering the ratio of capturing nanosized PM is undesirably high. The lower limit of $SD$ is preferably 0.22, and the upper limit is preferably 0.38.

The binder is preferably at least one selected from the group consisting of alumina particles, aluminum hydroxide particles, magnesium oxide particles, and magnesium hydroxide particles.

The organic binder may be methylcellulose, ethylcellulose, ethymethylcellulose, carboxymethylcellulose, hydroxypropylmethylcellulose, hydroxyethylcellulose, hydroxymethylcellulose, hydroxyethylethylcellulose, etc. Among them, hydroxypropylmethylcellulose and/or methylcellulose are preferable. The organic binder is preferably 5-15% by mass per 100% by mass of the starting material (silicon carbide particles+binder).

The ceramic particles comprising the aggregate and the binder are mixed with the organic binder, and then blended with water to form a plasticized moldable material. The amount of water added, which is controlled to provide the moldable material with consistency suitable for molding, is preferably 20-50% by mass of the starting material.

The formed moldable material is extrusion-molded through a known honeycomb-structure-molding die by a known method to form a honeycomb-structured green body. This green body is dried, and then machined on its end surfaces, outer peripheral surface, etc., if necessary. It is then sintered in a temperature rang of 1200-1350° C. in an oxidizing atmosphere to produce a silicon carbide ceramic honeycomb structure.

Though not restrictive, the drying method may be, for example, hot-air drying, microwave-heating drying, high-frequency-heating drying, etc.

By sintering in a temperature range of 1200-1350° C., binder particles (at least one selected from the group consisting of alumina particles, aluminum hydroxide particles, magnesium oxide particles, and magnesium hydroxide particles) are sintered to form binder layers binding silicon carbide particles. Because of sintering at such a relatively low temperature, the sintering cost for forming the binder layers can be made lower than ever. The sintering temperature of lower than 1200° C. insufficient binds the silicon carbide particles, failing to obtain sufficient strength. On the other hand, when it is higher than 1350° C., the heat shock resistance is low. Because of sintering in an oxidizing atmosphere, cost increase can be avoided in the sintering process.

The present invention will be explained below in further detail referring to Examples, without intention of restricting the present invention to thereto.

Examples 1-5

Silicon carbide particles and other particles having the particle diameters shown in Table 1 in the amounts shown in Table 1 were mixed with hydroxypropylmethylcellulose as an organic binder. Each of the resultant starting material mixtures was blended with water to form a plasticized moldable material, which was extrusion-molded through a honeycomb-structure-molding die in a screw-molding machine, to form a honeycomb-structured green body having a quadrilateral peripheral shape of 34 mm in each side and a length of 304 mm. This green body was dried at 120° C. for 2 hours by a hot-air drying machine, and then sintered at the highest temperature of 1300° C. in an oxidizing atmosphere to obtain each silicon carbide ceramic honeycomb structure of Examples 1-5 having a cell wall thickness of 8 mil (0.20 mm) and a cell density of 300 cpsi (46.5 cells/cm$^2$).

Comparative Examples 1 and 7

The silicon carbide ceramic honeycomb structures of Comparative Examples 1 and 7 were produced in the same manner as in Example 1, except that the types and amounts of silicon carbide particles and binder particles were changed as shown in Table 1, that a degreasing step at 550° C. for 3 hours was added after drying the green body by hot air, and that sintering was conducted at the highest temperature of 1450° C. for 2 hours in an argon atmosphere.

Comparative Examples 2-6

The silicon carbide ceramic honeycomb structures of Comparative Examples 2-6 were produced in the same manner as in Example 1, except that each honeycomb-structured green body was molded by the same method as in Example 1 with the types and amounts of silicon carbide particles and binder particles changed as shown in Table 1, and that sintering was conducted at the highest temperature of 1300° C. in Comparative Examples 2 and 4-6 and at the highest temperature of 1400° C. in Comparative Example 3, in an oxidizing atmosphere.

One of the silicon carbide ceramic honeycomb structures formed in each of Examples 1-5 and Comparative Examples 1-7 was measured with respect to an average pore width, the number of pores per length, porosity, a median pore diameter, and a coefficient of thermal expansion.

(a) Average Pore Width and Number of Pores Per Length

The average pore width and the number of pores per length are measured as follows. A cell wall cross section of each ceramic honeycomb structure perpendicular to the axial direction is photographed by a scanning electron microscope (SEM) at a magnification of 200 folds. The resultant SEM photograph is measured by an image analyzer (Image-Pro Plus ver. 7.0 available from Media Cybernetics). Specifically, the SEM photograph is processed to a black-and-white binary image shown in FIG. 4 by the image analyzer. As shown in FIG. 5, in the photographed cross section of a cell wall 12, a straight line C is drawn in parallel with the cell wall surface such that it passes a center in the direction of the thickness T of the cell wall, and straight lines are drawn in parallel with the straight line C such that they are separate from the straight line C by T/5 and ±2T/5 in the thickness direction of the cell wall. The pore widths (lengths of pore portions crossing each straight line) and the number of pores crossing each straight line were measured in the predetermined length of each straight line. A sum of the measured pore widths was divided by the total number of measured pores to determine the average pore width W, and the total number of measured pores was divided by the total length of the measured straight lines to determine the number N of pores per length.

(b) Measurement of Porosity and Median Pore Diameter

The porosity and the median pore diameter were measured by mercury porosimetry. A test piece (10 mm×10 mm×10 mm) cut out of each ceramic honeycomb filter was set in a measurement cell of Autopore III available from Micromeritics, and the cell was evacuated. Thereafter, mercury was introduced into the cell under pressure to determine the relation between the pressure and the volume of mercury pressed into pores in the test piece. The pressure was converted to a pore diameter and cumulated from the larger pore diameter side to the smaller pore diameter side to determine a cumulative pore volume (corresponding to the volume of mercury), which was plotted against the pore diameter, thereby obtaining a graph showing the relation between pore diameter and cumulative pore volume. The mercury-intruding pressure was 0.5 psi (0.35×10$^{-3}$ kg/mm$^2$), and constants used for calculating the pore diameter from the pressure were a contact angle of 130° and a surface tension of 484 dyne/cm. A cumulative pore volume at which the pressure of mercury was 1800 psi (1.26 kg/mm$^2$ corresponding to a pore diameter of about 0.1 μm) was regarded as the total pore volume.

From the mercury porosimetry measurement results, the total pore volume, and the median pore diameter at which the cumulative pore volume was 50% of the total pore volume were determined. These results are shown in Table 2.

(c) Measurement of Coefficient of Thermal Expansion

A test piece having a cross section shape of 4.5 mm×4.5 mm and a length of 50 mm was cut out of the ceramic honeycomb structure with its longitudinal direction substantially in alignment with the flow path direction, and heated from room temperature to 800° C. at a temperature-elevating rate of 10° C./minute to measure longitudinal length increase under a constant load of 20 g by a compression-load- and differential-expansion-type thermomechanical analyzer TMA (ThermoPlus available from Rigaku Corp.), to determine an average coefficient of thermal expansion between 40° C. and 800° C. The results are shown in Table 2.

End portions of flow paths in each silicon carbide ceramic honeycomb structure of Examples 1-5 and Comparative Examples 1-7 were alternately sealed by a plugging material slurry comprising silicon carbide particles, and the plugging material slurry was dried to form plugs. The silicon carbide ceramic honeycomb structure with plugs was used as a honeycomb segment, with its outer peripheral surface coated with a binder comprising silicon carbide particles and colloidal silica. 6×6 honeycomb segments were integrally bonded, and the resultant outer peripheral surface portion was machined to a circular shape in the cross section perpendicular to the axial direction. The machined outer peripheral surface was coated with a wall material comprising amorphous silica and colloidal silica, and dried to form an outer peripheral wall. In each of Examples 1-5 and Comparative Examples 1-7, two composite silicon carbide ceramic honeycomb filters each having an outer diameter of 266.7 mm, a length of 304.8 mm, a cell wall thickness of 8 mil (0.20 mm) and a cell density of 300 cpsi (46.5 cells/cm$^2$) were obtained.

One of the ceramic honeycomb filters in each of Examples 1-5 and Comparative Examples 1-7 was measured with respect to pressure loss at an early PM-capturing stage and a number-based PM-capturing ratio after starting the capturing of PM, by the following methods.

(d) Pressure Loss after Capturing PM

The pressure loss after capturing PM was measured on each ceramic honeycomb filter fixed to a pressure loss test stand, by supplying combustion soot having an average particle diameter of 0.11 μm at a rate of 1.3 g/h together with air at a flow rate of 10 Nm$^3$/min, and measuring pressure difference between the inlet side and the outlet side (pressure loss) when the amount of soot accumulated reached 2 g per 1 L of the volume of the filter. The pressure loss after capturing PM was evaluated by the following standard.

Poor The pressure loss was more than 2.8 kPa.
Fair The pressure loss was more than 2.5 kPa and 2.8 kPa or less.
Good The pressure loss was more than 2.3 kPa and 2.5 kPa or less.
Excellent The pressure loss was 2.3 kPa or less.

(e) Number-Based PM-Capturing Ratio

The number-based PM-capturing ratio was measured on each ceramic honeycomb filter fixed to a pressure loss test stand, by supplying combustion soot having an average particle diameter of 0.11 μm at a rate of 1.3 g/h together with air at a flow rate of 10 Nm$^3$/min, and measuring the number of combustion soot particles flowing into and from the honeycomb filter per 1 minute by a scanning mobility particle sizer SMPS (Model 3936 available from TIS). The number-based PM-capturing ratio was calculated by the formula of $(N_{in}-N_{out})/N_{in}$, wherein $N_{in}$ represents the number of combustion soot particles flowing into the honeycomb filter, and $N_{out}$ represents the number of combustion soot particles flowing from the honeycomb filter, in 1 minute between 40 minutes and 41 minutes after the start of supplying. The number-based PM-capturing ratio was evaluated by the following standard.

| | |
|---|---|
| Excellent | The PM-capturing ratio was 98% or more. |
| Good | The PM-capturing ratio was 96% or more and less than 98%. |
| Fair | The PM-capturing ratio was 95% or more and less than 96%. |
| Poor | The PM-capturing ratio was less than 95%. |

TABLE 1

| | Aggregate | | | |
|---|---|---|---|---|
| No. | SiC Particles (Mass %) | Median Particle Diameter (μm) | D10 (μm) | D90 (μm) |
| Example 1 | 90.0 | 40.4 | 25.8 | 62.3 |
| Example 2 | 87.5 | 41.1 | 25.7 | 63.4 |
| Example 3 | 90.0 | 39.4 | 25.5 | 60.5 |
| Example 4 | 90.0 | 41.1 | 29.5 | 59.1 |
| Example 5 | 87.3 | 41.1 | 29.5 | 53.1 |
| Com. Ex. 1 | 80.0 | 52 | 37 | 76 |
| Com. Ex. 2 | 90.0 | 51.1 | 8.6 | 147.3 |
| Com. Ex. 3 | 90.0 | 51.1 | 8.6 | 147.3 |
| Com. Ex. 4 | 90.0 | 51.7 | 34.1 | 79.7 |
| Com. Ex. 5 | 90.0 | 51.7 | 34.1 | 79.7 |
| Com. Ex. 6 | 90.0 | 51.1 | 8.6 | 147.3 |
| Com. Ex. 7 | 80.0 | 39.4 | 25.2 | 60.7 |

| | Binder | | | | |
|---|---|---|---|---|---|
| No. | Binder Particles | % by Mass | Median Particle Diameter (μm) | D10 (μm) | D90 (μm) |
| Example 1 | Alumina | 5.38 | 5.0 | 2.1 | 11.6 |
| | Magnesium Hydroxide | 4.62 | 3.1 | 1.1 | 5.5 |
| Example 2 | Alumina | 7.36 | 5.0 | 2.1 | 11.6 |
| | Magnesium Hydroxide | 5.13 | 3.1 | 1.1 | 5.5 |
| Example 3 | Alumina | 5.89 | 4.9 | 2.2 | 11.7 |
| | Magnesium Hydroxide | 4.11 | 3.1 | 1.1 | 5.5 |
| Example 4 | Alumina | 5.89 | 4.9 | 2.2 | 11.7 |
| | Magnesium Hydroxide | 4.11 | 3.1 | 1.1 | 5.5 |
| Example 5 | Aluminum Hydroxide | 8.74 | 10.8 | 2.1 | 20.3 |
| | Magnesium Hydroxide | 3.99 | 3.1 | 1.1 | 5.5 |

TABLE 1-continued

| | | | | | |
|---|---|---|---|---|---|
| Com. Ex. 1 | Metallic Silicon | 20.0 | 14 | 0.2 | 42 |
| Com. Ex. 2 | Alumina | 6.36 | 5.0 | 2.2 | 11.7 |
| | Magnesium Hydroxide | 3.64 | 3.1 | 1.1 | 5.5 |
| Com. Ex. 3 | Alumina | 6.36 | 5.0 | 2.2 | 11.7 |
| | Magnesium Hydroxide | 3.64 | 3.1 | 1.1 | 5.5 |
| Com. Ex. 4 | Alumina | 6.36 | 5.0 | 2.2 | 11.7 |
| | Magnesium Hydroxide | 3.64 | 3.1 | 1.1 | 5.5 |
| Com. Ex. 5 | Aluminum Hydroxide | 7.28 | 10.8 | 2.1 | 20.3 |
| | Magnesium Hydroxide | 2.72 | 5.9 | 0.6 | 13.9 |
| Com. Ex. 6 | Alumina | 4.28 | 5.0 | 2.2 | 11.7 |
| | Magnesium Hydroxide | 5.72 | 3.1 | 1.1 | 5.5 |
| Com. Ex. 7 | Metallic Silicon | 20.0 | 6.4 | 0.2 | 17.8 |

| | Ceramic Particles (Aggregate + Binder) | | | |
|---|---|---|---|---|
| No. | Median Particle Diameter (μm) | D10 (μm) | D90 (μm) | SD |
| Example 1 | 39 | 9.4 | 63 | 0.32 |
| Example 2 | 38 | 5.8 | 62 | 0.39 |
| Example 3 | 38 | 13.4 | 59 | 0.29 |
| Example 4 | 40 | 17.6 | 58 | 0.23 |
| Example 5 | 36 | 7.6 | 55 | 0.33 |
| Com. Ex. 1 | 48 | 14.0 | 76 | 0.33 |
| Com. Ex. 2 | 42 | 5.6 | 142 | 1.05 |
| Com. Ex. 3 | 42 | 5.6 | 142 | 1.05 |
| Com. Ex. 4 | 50 | 17.2 | 78 | 0.28 |
| Com. Ex. 5 | 50 | 20.3 | 78 | 0.28 |
| Com. Ex. 6 | 42 | 5.3 | 142 | 1.05 |
| Com. Ex. 7 | 36 | 5.2 | 58 | 0.44 |

TABLE 2

| No. | Average Pore width W (μm) | Number N of Pores (/mm) | Porosity (%) | Median Pore Diameter (μm) | Pore Volume (%) ≥20 μm | Pore Volume (%) ≤9 μm |
|---|---|---|---|---|---|---|
| Example 1 | 14.8 | 26.5 | 45.4 | 10.7 | 13.6 | 22.8 |
| Example 2 | 18.2 | 29.0 | 41.9 | 10.8 | 13.3 | 20.0 |
| Example 3 | 11.6 | 30.2 | 44.8 | 10.6 | 11.4 | 23.0 |
| Example 4 | 10.6 | 28.4 | 40.5 | 11.0 | 12.0 | 19.4 |
| Example 5 | 17.4 | 23.4 | 39.0 | 13.6 | 18.2 | 4.2 |
| Com. Ex. 1 | 37.7 | 11.8 | 50.2 | 22.0 | 61.1 | 1.8 |
| Com. Ex. 2 | 17.6 | 17.5 | 44.9 | 13.5 | 17.0 | 12.2 |
| Com. Ex. 3 | 28.7 | 9.7 | 39.4 | 26.9 | 82.2 | 5.8 |
| Com. Ex. 4 | 19.4 | 20.9 | 34.5 | 17.4 | 36.5 | 30.6 |
| Com. Ex. 5 | 19.4 | 20.9 | 50.7 | 13.2 | 14.5 | 8.9 |
| Com. Ex. 6 | 29.8 | 13.6 | 42.1 | 21.8 | 64.9 | 1.0 |
| Com. Ex. 7 | 18.6 | 16.7 | 42.3 | 10.5 | 19.3 | 33.5 |

| No. | Pressure Loss | PM-Capturing Ratio | CTE ($\times 10^{-7}/°C$) |
|---|---|---|---|
| Example 1 | Excellent | Excellent | 43 |
| Example 2 | Good | Excellent | 44 |
| Example 3 | Good | Excellent | 45 |
| Example 4 | Good | Excellent | 47 |
| Example 5 | Good | Excellent | 43 |
| Com. Ex. 1 | Fair | Poor | 46 |
| Com. Ex. 2 | Poor | Good | 44 |
| Com. Ex. 3 | Good | Poor | 53 |
| Com. Ex. 4 | Poor | Poor | 44 |

TABLE 2-continued

| | | | |
|---|---|---|---|
| Com. Ex. 5 | Good | Poor | 46 |
| Com. Ex. 6 | Poor | Poor | 45 |
| Com. Ex. 7 | Poor | Poor | 46 |

Note:
(1) CTE means "coefficient of thermal expansion."

It is clear from Tables 1 and 2 that the ceramic honeycomb filters of Examples 1-5 each having porosity, a median pore diameter, and an average pore width and the number of pores in a cell wall cross section within the ranges of the present invention exhibited better PM-capturing ratios with smaller pressure loss after capturing PM than those of the ceramic honeycomb filters of Comparative Examples 1-7 outside the ranges of the present invention in these requirements, as well as a coefficient of thermal expansion and thus heat shock resistance on the same level.

What is claimed is:

1. A silicon carbide ceramic honeycomb structure having large numbers of axially penetrating flow paths partitioned by porous silicon carbide cell walls,
   the silicon carbide ceramic honeycomb structure being formed by integrally bonding large numbers of honeycomb segments by binder layers, so as to have an outer periphery having a circular shape in a cross section perpendicular to the axial direction, and forming an outer peripheral wall on the outer periphery,
   each honeycomb segment being composed of a sintered body of ceramic particles comprising aggregate and a binder,
   said binder being at least one selected from the group consisting of alumina particles, aluminum hydroxide particles, magnesium oxide particles, and magnesium hydroxide particles,
   said cell walls having porosity of 40-50% and a median pore diameter of 8-18 µm, and
   when a straight line C is drawn in parallel with the cell wall surface such that it passes a center in the direction of the thickness T of said cell wall, and straight lines are drawn in parallel with said straight line C such that they are separate from said straight line C by ±T/5 and ±2T/5 in the thickness direction of said cell wall, to measure the lengths (pore widths) of pore portions crossing each straight line, and the number of pores crossing each straight line, in a cell wall cross section perpendicular to the axial direction,
   an average pore width W determined by averaging the lengths (pore widths) of all measured pore portions being 10-25 µm,
   the number N of pores per length determined by dividing the total number of the measured pores by the total length of the straight lines used for measurement being 20-40/mm,
   the volume of pores having pore diameters of 20 µm or more being 10-20% of the total pore volume in said cell walls, and the volume of pores having pore diameters of 9 µm or less being 3-25% of the total pore volume in said cell walls, in the relation between the pore diameter and cumulative pore volume of said cell walls measured by mercury porosimetry.

2. The silicon carbide ceramic honeycomb structure according to claim 1, wherein the flow paths of each honeycomb segment are composed of inlet-side-sealed flow paths having plugs on the inlet-side end surface and outlet-side-sealed flow paths having plugs on the outlet-side end surface, the inlet-side-sealed flow paths and the outlet-side-sealed flow paths being alternately positioned in a checkerboard pattern.

3. A method for producing the silicon carbide ceramic honeycomb structure according to claim 1, comprising (1) integrally bonding large numbers of honeycomb segments by binder layers, each honeycomb segment being formed by formulating, mixing and blending ceramic particles comprising aggregate and a binder with an organic binder to form a moldable material, extrusion-molding said moldable material to a honeycomb shape, and drying and then sintering the resultant green body, (2) machining the resultant composite structure to have an outer periphery having a circular, and then (3) covering the machined outer periphery with a coating material to form an outer peripheral wall,
   said aggregate being silicon carbide particles,
   said binder being at least one selected from the group consisting of alumina particles, aluminum hydroxide particles, magnesium oxide particles and magnesium hydroxide particles,
   said ceramic particles having a median particle diameter D50 of 37-45 µm, and
   in a curve showing the relation between particle diameter and cumulative particle volume,
   the particle diameter D10 at a cumulative particle volume corresponding to 10% of the total particle volume being 5-20 µm,
   the particle diameter D90 at a cumulative particle volume corresponding to 90% of the total particle volume being 52-65 µm, and
   the particle size distribution deviation SD being 0.20-0.40, wherein SD=log(D80)−log(D20), D20 is a particle diameter at a cumulative particle volume corresponding to 20% of the total particle volume, D80 is a particle diameter at a cumulative particle volume corresponding to 80% of the total particle volume, and D20<D80.

4. The method for producing the silicon carbide ceramic honeycomb structure according to claim 3, wherein the sintering is conducted in a temperature range of 1200-1350° C. in an oxidizing atmosphere.

* * * * *